US012733066B2

(12) United States Patent
Yang

(10) Patent No.: US 12,733,066 B2
(45) Date of Patent: Sep. 8, 2026

(54) METHOD AND APPARATUS FOR CONTROLLING TIMER, COMMUNICATION DEVICE, AND STORAGE MEDIUM

(71) Applicant: Beijing Xiaomi Mobile Software Co., Ltd., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 642 days.

(21) Appl. No.: 18/246,169

(22) PCT Filed: Sep. 25, 2020

(86) PCT No.: PCT/CN2020/117877
§ 371 (c)(1),
(2) Date: Mar. 21, 2023

(87) PCT Pub. No.: WO2022/061756
PCT Pub. Date: Mar. 31, 2022

(65) Prior Publication Data

US 2023/0371117 A1 Nov. 16, 2023

(51) Int. Cl.
*H04W 76/28* (2018.01)

(52) U.S. Cl.
CPC .................................. *H04W 76/28* (2018.02)

(58) Field of Classification Search
None
See application file for complete search history.

(56) References Cited

U.S. PATENT DOCUMENTS 12,477,621 B2 * 11/2025 Wang .................... H04W 76/14
2020/0037136 A1 * 1/2020 Adachi ................. H04W 8/065
2020/0120596 A1 * 4/2020 Yu ..................... H04W 52/0216
2022/0174780 A1 * 6/2022 Bao ................... H04W 52/0248

FOREIGN PATENT DOCUMENTS

CN 107257564 A 10/2017
CN 110475391 A 11/2019
CN 110881208 A 3/2020
CN 111050423 A 4/2020
CN 111699723 A 9/2020
WO 2019214541 A1 11/2019
WO WO-2020186467 A1 * 9/2020 ........... H04W 76/28

OTHER PUBLICATIONS

"Clarification on starting of drx-HARQ-RTT-TimerDL," Proceedings of the 3GPP TSG-RAN WG2 Meeting #103, Samsung, RAN2, R2-1813048, Aug. 23, 2018, Gothenburg, Sweden, 11 pages.

* cited by examiner

*Primary Examiner* — Jamaal Henson
(74) *Attorney, Agent, or Firm* — McCoy Russell LLP

(57) ABSTRACT

A method for controlling a timer, performed by a terminal, includes: in response to determining that a timer of a first discontinuous reception (DRX) configuration among a plurality of DRX configurations in the terminal is to be started, determining an operation on the timer of the first DRX configuration according to a running state of a timer of a second DRX configuration among the plurality of DRX configurations.

7 Claims, 5 Drawing Sheets

S101

In response to determining that a timer of a first discontinuous reception (DRX) configuration among a plurality of DRX configurations in a first terminal is to be started, an operation on the timer of the first DRX configuration is determined according to a running state of a timer of a second DRX configuration among the plurality of DRX configurations 800
802
804
Memory
Processing assembly
816
Communication assembly
806
Power supply assembly
808
Processor
820
814
Multimedia assembly
Sensor assembly
810
Audio assembly
Input/output interface
812

METHOD AND APPARATUS FOR CONTROLLING TIMER, COMMUNICATION DEVICE, AND STORAGE MEDIUM

CROSS REFERENCE TO RELATED APPLICATION

The present application is a U.S. National Phase of International Application No. PCT/CN2020/117877 entitled "TIMER CONTROL METHOD AND APPARATUS, COMMUNICATION DEVICE, AND STORAGE MEDIUM," and filed on Sep. 25, 2020. The entire contents of the above-listed applications are hereby incorporated by reference for all purposes.

BACKGROUND

In radio communication, terminals can start timers with corresponding functions according to discontinuous reception (DRX) configuration provided by the network, and achieve time control over various functions such as wake-up, dormancy and retransmission.

SUMMARY

The disclosure provides a method and an apparatus for controlling a timer, a communication device, and a storage medium.

According to a first aspect of examples of the disclosure, a method for controlling a timer is provided. The method is applied to a terminal and includes:

- in response to determining that a timer of a first discontinuous reception (DRX) configuration among a plurality of DRX configurations in the terminal is to be started,
- determining an operation on the timer of the first DRX configuration according to a running state of a timer of a second DRX configuration among the plurality of DRX configurations.

According to a second aspect of the examples of the disclosure, a communication device is provided. The communication device at least includes a processor and a memory for storing an executable instruction that may run on the processor, where

- the executable instruction executes steps of the above method for controlling a timer when the processor is configured to run the executable instruction.

According to a third aspect of the examples of the disclosure, a non-transitory computer-readable storage medium is provided, and stores a computer-executable instruction, where the computer-executable instruction implements steps of the above method for controlling a timer when executed by a processor.

BRIEF DESCRIPTION OF THE DRAWINGS

The drawings here are incorporated into the description as a constituent part of the description, illustrate examples conforming to the disclosure, and serve to explain principles of the examples of the disclosure along with the description.

DETAILED DESCRIPTION

Examples will be described in detail here, instances of which are shown in accompanying drawings. When the following description involves the accompanying drawings, the same numbers in different accompanying drawings represent the same or similar elements unless otherwise indicated. Implementations described in the following examples do not represent all implementations consistent with the examples of the disclosure. On the contrary, these implementations are merely instances of apparatuses and methods consistent with some aspects of the examples of the disclosure as detailed in the appended claims.

Terms used in the examples of the disclosure are merely used for describing specific examples rather than limiting the examples of the disclosure. As used in the examples and the appended claims of the disclosure, the singular forms such as "a", "an" and "this" are also intended to include plural forms, unless otherwise clearly stated in the context. It may also be understood that the term "and/or" used here refers to and includes any or all possible combinations of one or more associated listed items.

It may be understood that although terms such as first, second and third can be used in the examples of the disclosure to describe different types of information, the information may not be limited to these terms. These terms are merely used to distinguish the same type of information from each other. For instance, first information can be referred to as second information, and similarly, second information can be referred to as first information, without departing from the scope of the examples of the disclosure. Depending on the context, the words "if" and "as if" as used here can be interpreted as "at the time of" or "when" or "in response to determining".

With the development of radio communication technology, the terminals can communicate with each other directly through a sidelink (SL). A plurality of different terminals can transmit data to each other. The terminals can implement the above DRX configuration through the SL with different timers. However, when different SLs provide a DRX configuration for the same terminal, the terminal possibly will enter dormancy or wake up in advance due to conflicts between the timers, resulting in data loss.

Examples of the disclosure relate to, but are not limited to, the field of radio communication, in particular to a method and an apparatus for controlling a timer, a communication device, and a storage medium.

In order to better describe any example of the disclosure, an example of the disclosure will be illustratively described by taking an application scenario of access control as an instance.

Figure 1:
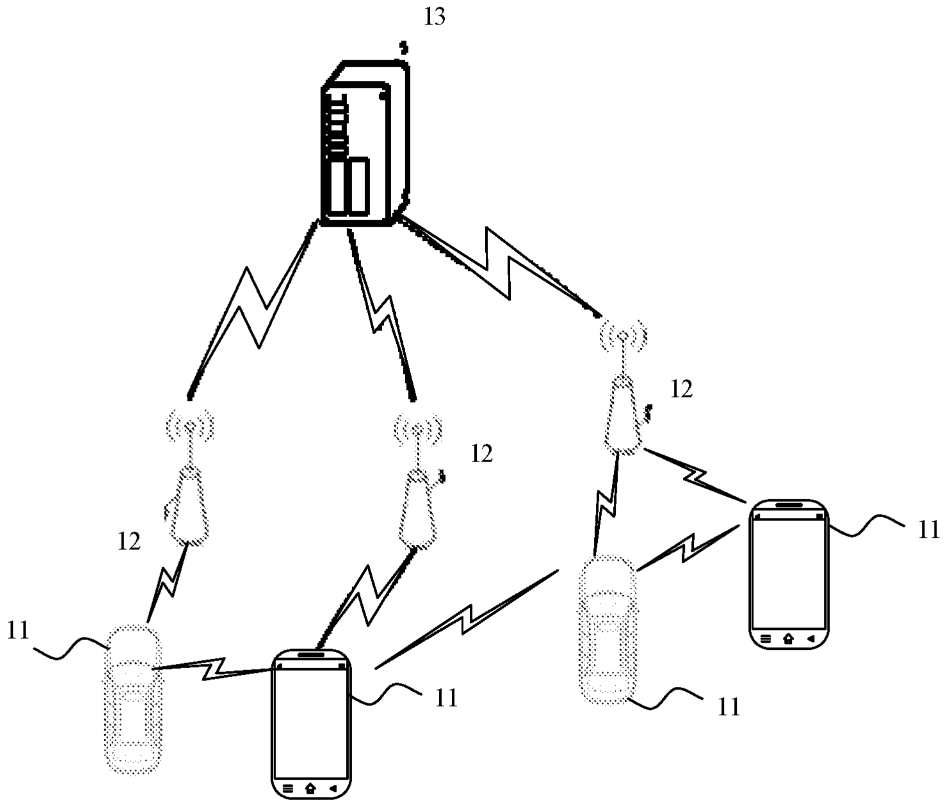
FIG. 1 is a schematic structural diagram of a radio communication system according to an example.

With reference to FIG. 1, a schematic structural diagram of a radio communication system according to an example of the disclosure is shown. As shown in FIG. 1, the radio communication system is a communication system based on cellular mobile communication technology. The radio communication system may include several terminals 11 and several base stations 12.

The terminal 11 may be a device that provides voice and/or data connectivity for a user. The terminal 11 may communicate with one or more core networks via a radio access network (RAN). The terminal 11 may be an Internet of Things terminal, such as a sensor device, a mobile phone (or a “cellular” phone) and a computer with an Internet of Things terminal. For instance, the terminal may be a fixed, portable, pocket-type, handheld, computer built-in or vehicle-mounted apparatus. For instance, the terminal may be a station (STA), a subscriber unit, a subscriber station, a mobile station, a mobile, a remote station, an access point, a remote terminal, an access terminal, a user terminal, a user agent, a user device or user terminal (UT). In some examples, the terminal 11 may also be a device of an unmanned aerial vehicle. In some examples, the terminal 11 may also be a vehicle-mounted device, for instance, an electronic control unit having a radio communication function, or a radio terminal externally connected with an electronic control unit. In some examples, the terminal 11 may also be a roadside device, such as a street lamp, a signal lamp or other roadside devices having a radio communication function.

The base station 12 may be a network-side device in a radio communication system. The radio communication system may be a $4^{th}$ generation mobile communication (4G) system, also known as a long term evolution (LTE) system, or the radio communication system may be a 5G system, also known as a new radio (NR) system or a 5G NR system. Or, the radio communication system may be a next-generation system after the 5G system. An access network in the 5G system may be called a new generation-radio access network (NG-RAN).

The base station 12 may be an evolved base station (eNB) used in the 4G system. Or, the base station 12 may be a base station (gNB) having a centralized distributed architecture in the 5G system. When having the centralized distributed architecture, the base station 12 usually includes a central unit (CU) and at least two distributed unit (DU). Protocol stacks of a packet data convergence protocol (PDCP) layer, a radio link control (RLC) layer and a media access control (MAC) layer are set in the central unit. A physical (PHY) layer protocol stack is set in the distributed unit. A specific implementation of the base station 12 is not limited in the example of the disclosure.

A radio connection may be established between the base station 12 and the terminal 11 through a radio. In different implementations, the radio is a radio based on the fourth generation mobile communication network technology (4G) standard, or the radio is a radio based on the fifth generation mobile communication network technology (5G) standard, for instance, the radio is new radio, or the radio may be a radio based on the next generation mobile communication network technology after 5G.

In some examples, an end to end (E2E) connection may also be established between the terminals 11, for instance, vehicle to vehicle (V2V) communication, vehicle to infrastructure (V2I) communication and vehicle to pedestrian (V2P) communication in vehicle to everything (V2X).

In some examples, the radio communication system above may further include a network management device 13.

Several base stations 12 are separately connected to the network management device 13. The network management device 13 may be a core network device in the radio communication system, for instance, the network management device 13 may be a mobility management entity (MME) in an evolved packet core network (EPC). Or, the network management device may be other core network devices, such as serving gateway (SGW), public data network gateway (PGW), a policy and charging rules function (PCRF) or a home subscriber server (HSS). An implementation form of the network management device 13 is not limited in the example of the disclosure.

In some examples, in order to save power consumption of the user equipment (UE), a network may configure discontinuous reception (DRX) for the UE. When the UE is connected, a DRX configuration includes an inactivity timer, an on duration timer, a cycle and a start offset, an uplink hybrid automatic repeat request round-trip time (HARQ RTT) timer, a downlink HARQ RTT timer, an uplink retransmission timer, a downlink retransmission timer, etc. The cycle and the start offset may be used to determine a cyclic start time point of the on duration timer. When the UE receives downlink control information (DCI) with its own cell-radio network temporary identifier (C-RNTI) from a physical downlink control channel (PDCCH), the UE may start the inactivity timer. The UE may merely listen to the PDCCH during on duration, and may not listen to the PDCCH at the rest of time, thus reducing power consumption. When the UE receives a medium access control protocol data unit (MAC PDU), the UE sends feedback to the base station and starts the downlink HARQ RTT timer corresponding to an HARQ process. When the downlink HARQ RTT timer times out, the downlink retransmission timer is started. When the UE sends PUSCH transmission, the UE starts the uplink HARQ RTT timer corresponding to the HARQ process, and when the uplink HARQ RTT timer times out, the uplink retransmission timer is started. The on duration includes time when the on duration timer, the inactivity timer, the uplink retransmission timer and the downlink retransmission timer run.

Figure 2:
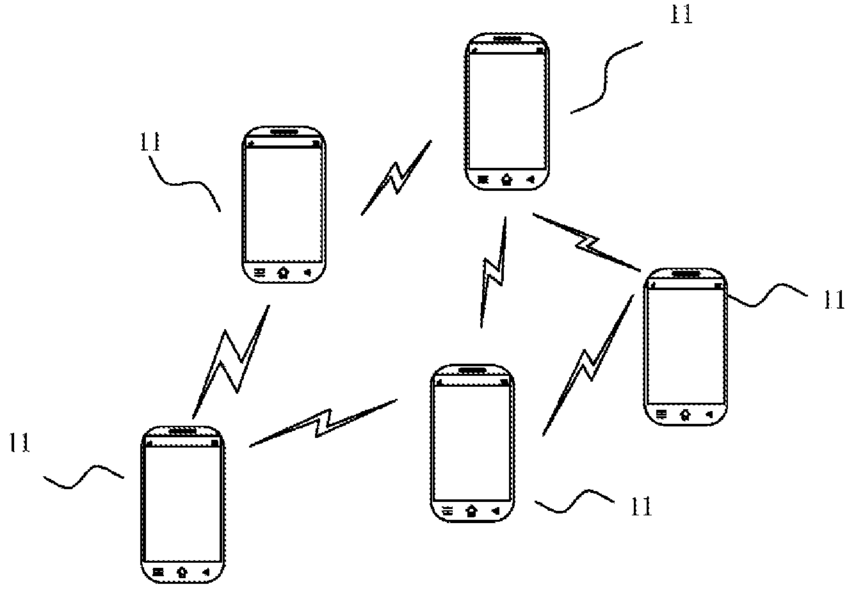
FIG. 2 is a schematic structural diagram of another radio communication system according to an example.

To support direct communication between UE and UE, a direct link (SL) communication mode is introduced, and an interface between UE and UE is PC-5. As shown in FIG. 2, a plurality of terminals 11 are directly connected with each other through the SL. According to correspondence between transmission UE and reception UE, three transmission modes, unicast, multicast and broadcast, are supported on the SL. In unicast connection, each piece of UE corresponds to a target identifier. In multicast, each piece of UE may belong to one or more groups, and each group corresponds to a target identifier. In broadcast, all UE corresponds to at least one target identifier.

The SL transmission UE may configure a DRX cycle and timer parameters on the SL for the SL reception UE according to a network configuration or service features.

Figure 3:
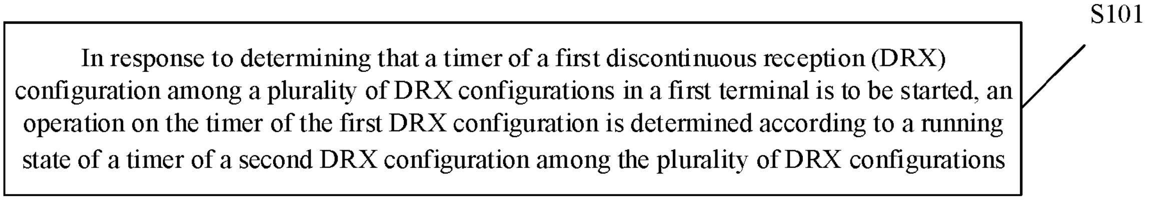
FIG. 3 is a first schematic flow diagram of a method for controlling a timer according to an example.

As shown in FIG. 3, the example of the disclosure provides a method for controlling a timer. The method is applied to a terminal and includes:

step 101: in response to determining that a timer of a DRX configuration among a plurality of DRX configurations in a first terminal is to be started, an operation on the timer of the first DRX configuration is determined according to a running state of a timer of a second DRX configuration among the plurality of DRX configurations.

In an example, the terminal may be the above UE that may transmit and receive data on the SL, and includes a mobile phone, a notebook computer and other electronic devices that may perform radio communication.

In another example, the terminal may be a dual-connection terminal or a multi-connection terminal, that is, the terminal may be connected to a plurality of base stations, and if a plurality of base stations configure the DRX configuration for cellular communication for the terminal, the DRX configuration may also be a DRX configuration for a cellular communication radio link.

Each DRX configuration may include:

a timer configuration.

The timer configuration may include an inactivity timer configuration and/or an on duration timer configuration, etc. What is described above is merely an instance of the DRX configuration certainly. During actual implementation, the DRX configuration includes the DRX cycle, etc.

The plurality of DRX configurations in the terminal may be used to configure different types of timers, and may also be used to configure the same type of timers. When the timer of the first DRX configuration has the same type as the timer of the second DRX configuration among the plurality of DRX configurations, a conflict between the timers may occur. For instance, start of the timer of the first DRX configuration may result in restart of the timer of the second DRX configuration, thus making the second DRX configuration invalid. If the timer runs according to duration after restart, the timer may wake up or enter dormancy in advance, thus causing data loss.

Thus, in the example of the disclosure, when there is a timer of the first DRX configuration to be started, first, determining whether there is a timer of the second DRX configuration being running, whether the timer is restarted is determined according to parameters such as duration of the timers corresponding to the second DRX configuration and the first DRX configuration respectively if there is a timer of the second DRX configuration being running. That is, whether the timer is run according to the first DRX configuration or the second DRX configuration is determined.

If the timer of the second DRX configuration is not running, that is, in a current terminal, the timer of the second DRX configuration being running does not exist, the timer may be started directly according to the first DRX configuration.

In this way, the timer may be run by integrating different DRX configurations, thus reducing the conflict between the timers caused by different DRX configurations, further reducing in-advance dormancy or wake-up of the terminal, and reducing the data loss.

In some examples, an operation on the timer of the first DRX configuration is determined in response to determining whether the same type of timers are running in the current terminal.

In the example of the disclosure, various timers in the terminal are used for controlling time of different operations, for instance, a disabling timer for disabling transmission of an access request by the terminal to the base station, the on duration timer for controlling the on duration of the terminal, and the inactivity timer for controlling inactivity duration of the terminal. The same type of timers are used to instruct the terminal to execute the same operation. Thus, if a time having the same type as the timer of the first DRX configuration is already running in the terminal, it means that restart of the timer according to the first DRX configuration may cause timing parameters of the currently running timer to change.

The terminal may receive DRX configurations transmitted by other terminals on a plurality of sidelinks (SL), and start a corresponding timer based on different DRX configurations. Since the plurality of other terminals have no relation with each other, the DRX configurations transmitted by the plurality of other terminals may include a configuration for the same type of timers. If timing periods of the configuration for the same type of timers overlap with each other, the conflict between the timers may be caused.

For instance, if restart of the timer according to the first DRX configuration may cause configuration requirements of the currently running timer of the same type not to be satisfied, for instance, timing end of the on duration timer in advance causes the terminal to enter dormancy in advance. Thus, in this case, the timer may not be restarted according to the first DRX configuration, that is, the timer keeps running according to the original configuration.

However, if no timer of the same type is currently running, the timer may be started according to the first DRX configuration, and in this case a conflict with other DRX configurations may not be caused.

Thus, the above method may effectively reduce a conflict that the plurality of DRX configurations are used for configuring the same type of timers of the terminal, and further reduce the data loss due to early end caused by restart, etc. of the timer of the terminal.

In some examples, the step that an operation on the timer of the first DRX configuration is determined in response to determining whether the same type of timers are running in the current terminal includes:

the timer of the first DRX configuration is run based on the condition that no timer of the same type is running currently.

In this case, if no running timer having the same type as the timer of the first DRX configuration exists in the terminal, a conflict of a state of the terminal with DRX configurations of other terminals may not be caused under the condition that the timer of the first DRX configuration is started currently. Thus, in this case, in order to satisfy requirements of the first DRX configuration, the timer may be started and run according to the first DRX configuration.

It may be certainly understood that if when the timer of the first DRX configuration is running, a new timer of the same type of a new DRX configuration is to be started, it is needed to re-determine a relation between a time range of the timer of the first DRX configuration and a time range of the timer to be started. If the timer needs to be restarted according to the new DRX configuration, parameters of the current first DRX configuration may also be invalid. If the timer is not restarted according to the new DRX configuration, the timer will still run according to the current first DRX configuration.

In this way, the problems such as data loss caused by the conflict between configurations of the timer may be reduced under the condition that the terminal may receive the DRX configurations of the plurality of other terminals.

In some examples, the step that an operation on the timer of the first DRX configuration is determined in response to determining whether the same type of timers are running in the current terminal includes:

based on the condition that the timer of the same type is running, the operation on the timer of the first DRX configuration is determined according to a time range of the running timer.

In the example of the disclosure, if a running timer of the same type already exists in the terminal, the operation on the timer of the first DRX configuration is determined according to the time range of the running timer.

For instance, if a timing end time point of the running timer is later than a timing end time point of the timer of the first DRX configuration, restart of the timer according to the first DRX configuration may cause the timing of the timer to end in advance, and in this case, the timer of the first DRX configuration may be ignored and the timing of the original timer may be maintained.

If a timing end time point of the running timer is later than a timing end time point of the timer of the first DRX configuration, actual running duration of the timer may be prolonged relative to original duration under the condition of restart of the timer according to the first DRX configuration. That is, the prolonged timing duration may cover the timing duration of the timer of the first DRX configuration and the original timing duration of the timer. Thus, in this case, the timer may be restarted according to the first DRX configuration.

Thus, under the condition that the timer of the first DRX configuration is to be started, if the timer of the same type is currently running, it is uncertain about restart of the timer according to the first DRX configuration or direct neglect of the first DRX configuration. Instead, the timing parameters of the timer are comprehensively considered according to the existing configuration of the timer and the first DRX configuration, so as to satisfy the timing requirements of the existing configuration of the timer and the first DRX configuration. That is to say, in this case, actual timing duration of the timer that covers the original timing duration and new timing duration of the first DRX configuration may be selected, such that the timing requirements of the timer may be satisfied, and the situation that original configuration requirements are not satisfied due to early timing end caused by restart of the timer may be reduced.

The examples of the disclosure provide the method and the apparatus for controlling a timer, the communication device, and the storage medium. According to technical solutions of the examples of the disclosure, when the terminal has a timer to be started, running states of timers of other DRX configurations may be determined at first, and then the timer to be started may be operated according to the running states of the timers of other DRX configurations. In this way, different DRX configurations may be integrated to control the timer, thus reducing a conflict between the timers caused by the plurality of DRX configurations, and further reducing data loss of the terminal caused by dormancy or wake-up in advance due to the conflict between the timers.

Figure 4:
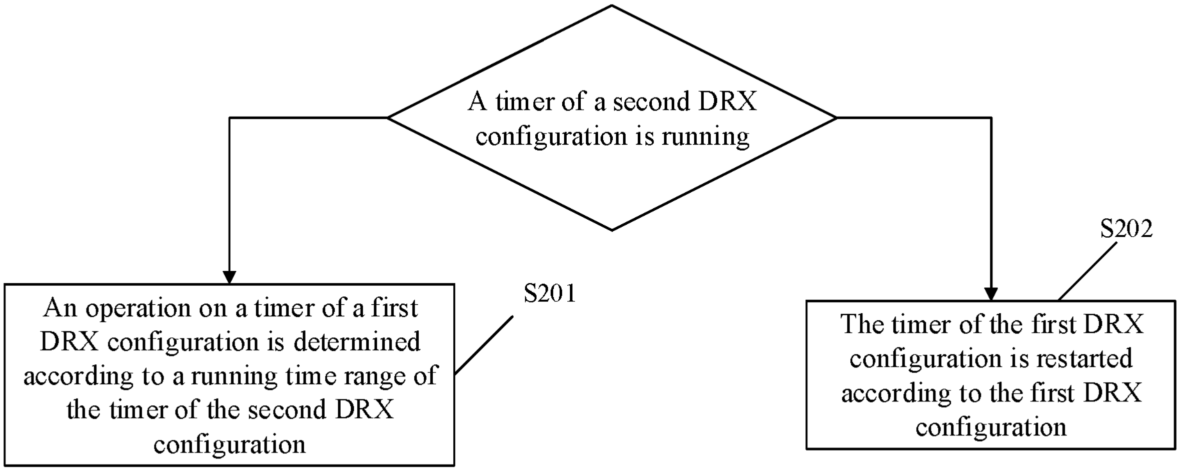
FIG. 4 is a second schematic flow diagram of a method for controlling a timer according to an example.

In some examples, as shown in FIG. 4, the step that an operation on the timer of the first DRX configuration is determined according to a running state of a timer of a second DRX configuration among the plurality of DRX configurations includes:

step 201. in response to determining that the timer of the second DRX configuration is running, the operation on the timer of the first DRX configuration is determined according to a running time range of the timer of the second DRX configuration;

and/or step 202. in response to determining that the timer of the second DRX configuration among the plurality of DRX configurations is not running, the timer of the first DRX configuration is started according to the first DRX configuration.

In the example of the disclosure, if the timer of the second DRX configuration is not running, no conflict with the timer of the first DRX configuration exits. Thus, the timer may be started directly according to the first DRX configuration, such that the timer is timed according to running duration of the first DRX configuration.

If the timer of the second DRX configuration is running, the duration of the timer of the first DRX configuration and the duration of the timer of the second DRX configuration may have an overlapped time range, so a conflict between the timers may exist. Under the condition that the running time of the running timer of the second DRX configuration includes the running time of the timer of the first DRX configuration, even if the timer is not restarted according to the first DRX configuration, sufficiently long timing duration may be achieved, that is, the timing duration of the first DRX configuration is satisfied. If the timing duration of the first DRX configuration causes the timing end time point of the timer after timer restart to be later than the timing end time point of the timer of the second DRX configuration, that is to say, the timer of the first DRX configuration may prolong the timing duration of the timer, so the timer is needed to be restarted; otherwise, the timer does not satisfy the timing duration of the first DRX configuration.

Thus, in the example of the disclosure, whether the timer is needed to be restarted according to the first DRX configuration is determined according to the running time range of the running timer of the Second DRX configuration.

Accordingly, if no running timer of the second DRX configuration exists, starting the timer according to the first DRX configuration may not lead to the timer conflict, so in this case, the timer is started according to the first DRX configuration.

Figure 5:
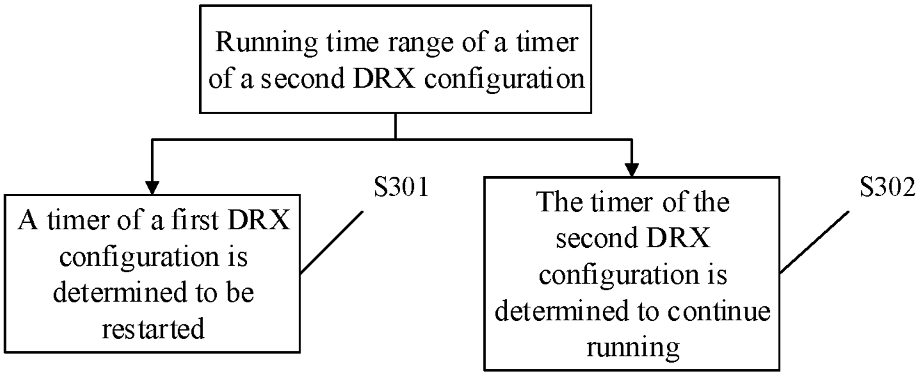
FIG. 5 is a third schematic flow diagram of a method for controlling a timer according to an example.

In some examples, as shown in FIG. 5, the step that the operation on the timer of the first DRX configuration is determined according to a running time range of the timer of the second DRX configuration includes:

step 301, the timer of the first DRX configuration is determined to be restarted according to the running time range of the timer of the second DRX configuration;

and/or step 302, the timer of the second DRX configuration is determined to continue running according to the running time range of the timer of the second DRX configuration.

In the example of the disclosure, the timer of the first DRX configuration and the timer of the second DRX configuration may be the same timer. Thus, if the timer of the second DRX configuration is running, whether the timer needs to be restarted is determined according to the running time range of the timer of the second DRX configuration. If the timer is restarted, the restarted timer runs according to the first DRX configuration. If the timer is not restarted, the timer may continue running according to the second DRX configuration.

In some examples, the step that the timer of the first DRX configuration is determined to be restarted according to the running time range of the timer of the second DRX configuration includes:

the timer of the first DRX configuration is determined to be restarted in response to determining that a timeout time point of the running timer of the second DRX configuration is earlier than a timeout time point of the first DRX configuration.

In the example of the disclosure, the condition that the timeout time point of the running timer of the second DRX configuration is earlier than the timeout time point of the first DRX configuration means that the timer may end timing before end of the timing duration of the first DRX configuration if the timer is not restarted, such that the requirements of the first DRX configuration are not satisfied. Thus, in this case, the timer may be restarted according to the first DRX configuration, such that the timer may run again according to the timing duration of the first DRX configuration. In this way, running duration of the timer may cover the timing duration of the second DRX configuration, so the restarted timer may satisfy the timing time requirements from the first DRX configuration and the second DRX configuration.

A restart time point of the restarted timer in this case may be a start timing point indicated by the first DRX configuration.

In this way, the phenomenon that the timer ends timing in advance due to the conflict between the timers, causing failure to satisfy the timing requirements and according to data loss may not occur.

In some examples, the step that the timer of the second DRX configuration is determined to continue running according to the running time range of the timer of the second DRX includes:

in response to determining that the timeout time point of the running timer of the second DRX configuration is later than the timeout time point of the first DRX configuration, the timer of the second DRX configuration is determined to continue running; and or, in response to determining that the timeout time point of the running timer of the second DRX configuration is equal to the timeout time point of the first DRX configuration, the timer of the second DRX configuration is determined to continue running.

In this case that the timeout time point of the running timer of the second DRX configuration is later than the timeout time point of the first DRX configuration, if the timer is restarted according to the first DRX configuration, the timer may end timing at the timeout time point of the first DRX configuration, and in this case, the timer may end timing in advance relative to the second DRX configuration. The early timing of the timer does not satisfy the requirements from the second DRX configuration, and is likely to result in loss of data corresponding to the second DRX configuration.

Thus, in the example of the disclosure, if the timeout time point of the timer of the second DRX configuration is later than the timeout time point of the first DRX configuration, the timing requirements from the first DRX configuration and the second DRX configuration may be satisfied by continuing running, instead of restarting, the timer according to the second DRX configuration.

Accordingly, if the timeout time point of the timer of the second DRX configuration is equal to the timeout time point of the first DRX configuration, the timing requirements from the first DRX configuration and the second DRX configuration may be satisfied by directly continuing running the timer according to the second DRX configuration.

In some examples, the timer of the first DRX configuration and the timer of the second DRX configuration are the same type of timers.

In the example of the disclosure, since the timer of the first DRX configuration and the timer of the second DRX configuration are the same type of timers, under the condition that the timer of the second DRX configuration is running, the timer is already running in the case that the timer is needed to be started according to the first DRX configuration. Thus, whether the timer is restarted according to the first DRX configuration may be determined according to the timing duration of the second DRX configuration.

In some examples, the plurality of DRX configurations are DRX configurations for the SL.

In the example of the disclosure, a communication manner of the SL is a direct communication manner between UE and UE, and PC-5 interface of UE is used to achieve direct transmission and reception of data. The SL supports the three transmission manners including the unicast, the multicast and the broadcast. For different transmission manners, the transmission UE corresponds to one or more corresponding target identifiers. Through the SL, the UE may configure DRX for other UE, and then configure the timer of the SL reception UE.

Since one piece of the SL reception UE may receive DRX configurations transmitted by different SL transmission UE at the same time, the method provided by the example of the disclosure may be used to reduce the conflict between the timers caused by DRX configurations of different SLs.

The example of the disclosure further provides an instance as follows:

in some examples, considering that a plurality of pieces of SL transmission UE may configure different DRX cycles and timer lengths for the same SL reception UE, when the cycles and timers configured by different SL sending UE are inconsistent, the UE needs to determine how to start the timer; otherwise, the timer may be caused to enter a dormancy state in advance, resulting in data loss.

Thus, in this case, the SL reception UE may store DRX configurations of the plurality of pieces of SL transmission UE.

When the timer needs to be started or restarted due to a DRX configuration and a reception signal of certain SL transmission UE, the SL reception UE needs to determine whether there exist the same type of timers being running currently.

In this case, the timer is started according to timing duration of the first DRX configuration under the condition that no timer of the same type is running currently.

If there is a timer of the same type being running, whether this timer that needs to be started or restarted may prolong wake-up time of the UE is determined, that is, whether the timer may cause the running timer to time out in advance.

If no early timeout is caused, the timer is restarted according to the timing duration of the timer of the DRX configuration.

If early timeout is caused, the timer may not be started or restarted.

Figure 6:
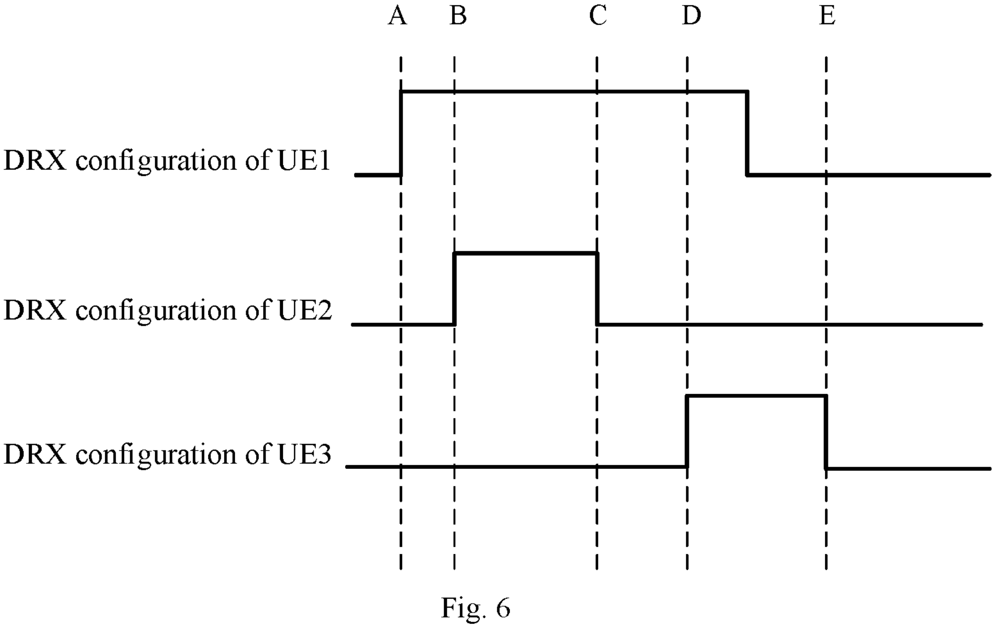
FIG. 6 is a schematic principle diagram of a timer of a plurality of discontinuous reception (DRX) configurations according to an example.

As shown in FIG. 6:

the SL reception UE receives DRX configurations of UE1, UE2 and UE3, timing duration of on duration timers are 3 s, 1 s and 1 s, and cycles are 5 s, 10 s and 10 s respectively.

At time point A, the on duration timer of the UE1 needs to be started, if UE a determines that there is no on duration timer running at this time, the duration of the on duration timer duration will be set to 3s and the on duration timer is started.

At time point B, the on duration timer of the UE2 needs to be started, UE a determines that there is an on duration timer running at this time, and before the current on duration timer times out (time point C), the on duration timer of the UE 2 will time out, the on duration timer may not be started or restarted.

At time point D, the on duration timer of the UE3 needs to be started, UE a determines that there is an on duration timer running at this time, and after the current on duration timer times out (time point E), the on duration timer of UE 2 may time out, the duration of the on duration timer duration is set to 1 s, and the on duration timer is restarted.

According to the above method, the UE may determine the operation on the timer by combining the plurality of different DRX configurations of the SL, thus reducing the problems of data loss caused by ending timing of the timer in advance due to the conflict among the plurality of DRX configurations.

Figure 7:
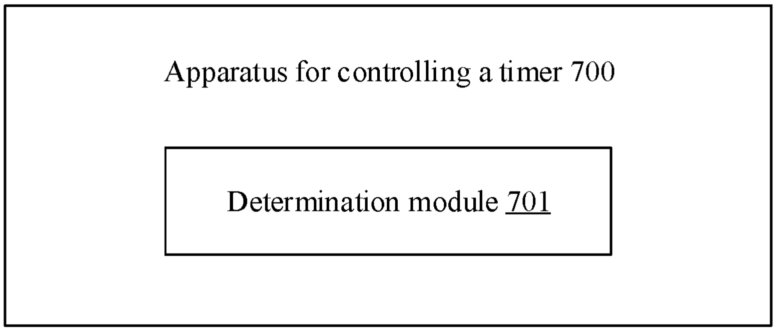
FIG. 7 is a structural block diagram of an apparatus for controlling a timer according to an example.

As shown in FIG. 7, the example of the disclosure further provides an apparatus 700 for controlling a timer. The apparatus is applied to a terminal and includes:

a determination module 701 configured to determine, in response to determining that a timer of a first DRX configuration among a plurality of DRX configurations in the terminal is to be started, an operation on the timer of the first DRX configuration according to a running state of a timer of a second DRX configuration among the plurality of DRX configurations.

In some examples, the determination module includes:

a first determination sub-module configured to determine, in response to determining that the timer of the second DRX configuration is running, the operation on the timer of the first DRX configuration according to a running time range of the timer of the second DRX configuration; and or, a first start sub-module configured to start, in response to determining that the timer of the second DRX configuration among the plurality of DRX configurations is not running, the timer of the first DRX configuration according to the first DRX configuration.

In some examples, the first determination sub-module includes:

a second determination sub-module configured to determine to restart the timer of the first DRX configuration according to the running time range of the timer of the second DRX configuration; and or, a third determination sub-module configured to determine to continue running the timer of the second DRX configuration according to the running time range of the timer of the second DRX configuration.

In some examples, the second determination sub-module includes:

a first restart sub-module configured to determine to restart the timer of the first DRX configuration in response to determining that a timeout time point of the running timer of the second DRX configuration is earlier than a timeout time point of the first DRX configuration.

In some examples, the third determination sub-module includes:

a first running sub-module configured to determine to continue running the timer of the second DRX configuration in response to determining that a timeout time point of the running timer of the second DRX configuration is later than a timeout time point of the first DRX configuration; and or, a second running sub-module configured to determine to continue running the timer of the second DRX configuration in response to determining that a timeout time point of the running timer of the second DRX configuration is equal to a timeout time point of the first DRX configuration.

In some examples, the timer of the first DRX configuration and the timer of the second DRX configuration are the same type of timers.

In some examples, the plurality of DRX configurations are DRX configurations for the SL.

With respect to the apparatus in the above examples, specific ways in which the various modules execute operations have been described in detail in the examples relating to the method, and will not be described in detail here.

Figure 8:
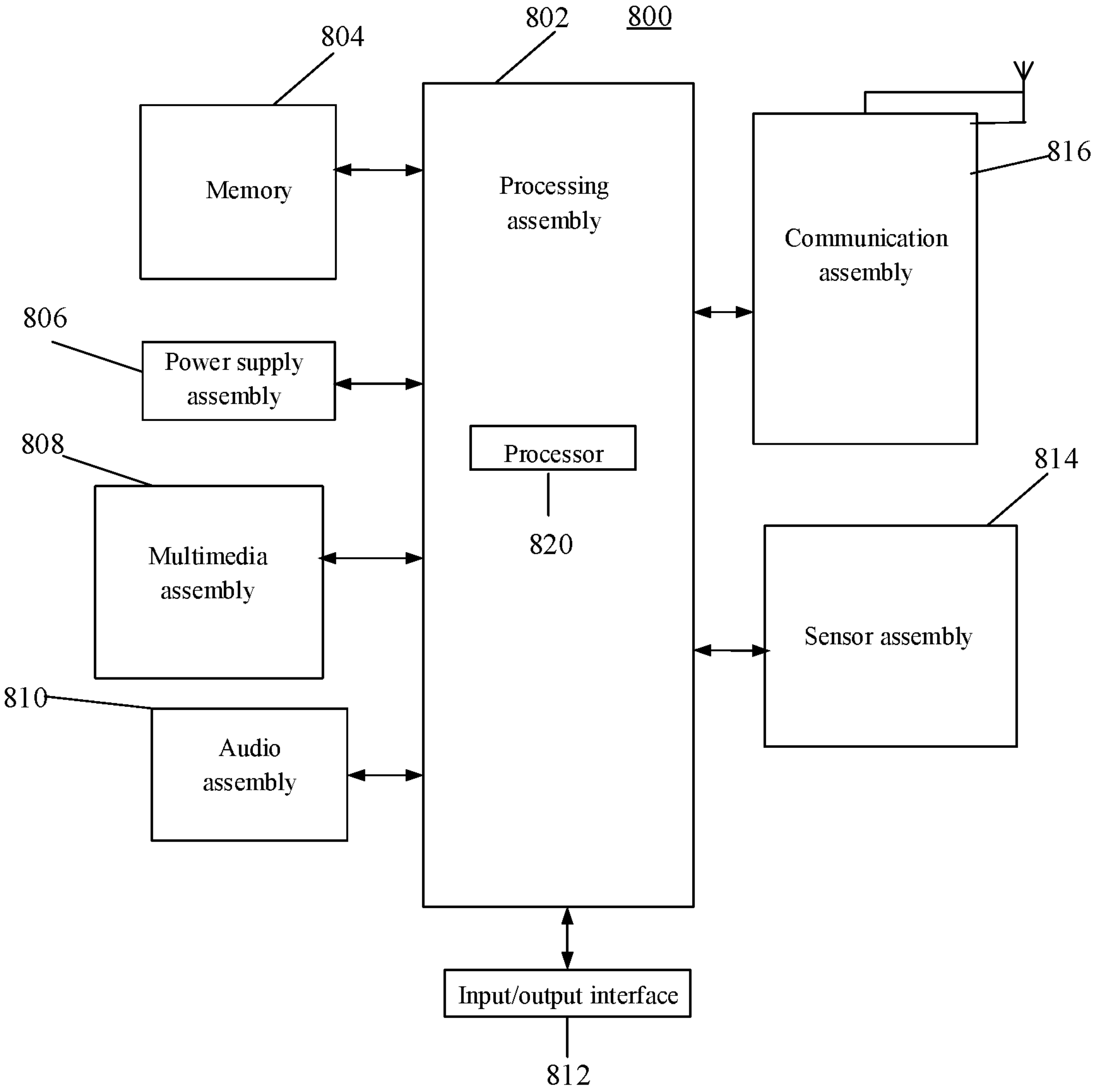
FIG. 8 is a first schematic structural diagram of a communication device according to an example.

FIG. 8 is a structural block diagram of a communication device according to an example of the disclosure. The communication device may be a terminal. For instance, the communication device 800 may be a mobile phone, a computer, digital broadcast user equipment, a message transceiving device, a game console, a tablet device, a medical device, a fitness device, a personal digital assistant, etc.

With reference to FIG. 8, the communication device 800 may include at least one of a processing assembly 802, a memory 804, a power supply assembly 806, a multimedia assembly 808, an audio assembly 810, an input/output (I/O) interface 812, a sensor assembly 814, and a communication assembly 816.

Generally, the processing assembly 802 controls an overall operation on the communication device 800, such as an operation associated with display, a telephone call, data communication, a camera operation, and a recording operation. The processing assembly 802 may include at least one processor 820 to execute an instruction, so as to complete all or some steps of the above method. In addition, the processing assembly 802 may include at least one module to facilitate interaction between the processing assembly 802 and other assemblies. For instance, the processing assembly 802 may include a multimedia module to facilitate interaction between the multimedia assembly 808 and the processing assembly 802.

The memory 804 is configured to store various types of data to support the operation on the communication device 800. Instances of these data include instructions, contact data, phonebook data, messages, pictures, video, etc. of any application or method operated on the communication device 800. The memory 804 may be implemented by any type of volatile or non-volatile storage device, or their combination, for instance, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 806 energizes various assemblies of the communication device 800. The power supply assembly 806 may include a power management system, at least one power supply, and other assemblies associated with power generation, management, and distribution for the communication device 800.

The multimedia assembly 808 includes a screen providing an output interface between the communication device 800 and a user. In some examples, the screen may include a liquid crystal display (LCD) and a touch panel (TP). If the screen includes the TP, the screen may be implemented as a touch screen to receive an input signal from the user. The TP includes at least one touch sensor to sense touching, swiping, and gestures on the TP. The touch sensor may not merely sense a boundary of a touch or swipe action, but also detect wake-up time and a pressure associated with the touch or swipe operation. In some examples, the multimedia assembly 808 includes a front facing camera and/or a rear facing camera. When the communication device 800 is in an operational mode, for instance, a photographing mode or a video mode, the front-facing camera and/or the rear-facing camera may receive external multimedia data. Each of the front-facing camera and the rear-facing camera may be a fixed optical lens system or have a focal length and an optical zoom capacity.

The audio assembly 810 is configured to output and/or input audio signals. For instance, the audio assembly 810 includes a microphone (MIC) configured to receive an external audio signal when the communication device 800 is in the operation mode, such as a call mode, a recording mode, and a voice recognition mode. The received audio signals may be further stored in the memory 804 or transmitted via the communication assembly 816. In some examples, the audio assembly 810 may further include a speaker for outputting audio signals.

The I/O interface 812 provides an interface between the processing assembly 802 and an peripheral interface module that may be a keyboard, a click wheel, a button, etc. These buttons may include, but are not limited to, a home button, a volume button, a start button, and a lock button.

The sensor assembly 814 includes at least one sensor for providing state assessments in various aspects for the communication device 800. For instance, the sensor assembly 814 may detect an on/off state of the device 800, and relative positioning of assemblies. For instance, the assemblies are a display and a keypad of the communication device 800. The sensor assembly 814 may also detect a change in position of the communication device 800 or an assembly of the communication device 800, presence or absence of contact between the user and the communication device 800, orientation or acceleration/deceleration of the communication device 800, and temperature change of the communication device 800. The sensor assembly 814 may include a proximity sensor configured to detect presence of nearby objects without any physical contact. The sensor assembly 814 may further include an optical sensor, such as a complementary metal-oxide-semiconductor transistor (CMOS) or charge-coupled device (CCD) image sensor, for use in imaging applications. In some examples, the sensor assembly 814 may further include an acceleration sensor, a gyroscope sensor, a magnetic sensor, a pressure sensor, or a temperature sensor.

The communication assembly 816 is configured to facilitate wired or radio communication between the communication device 800 and other devices. The communication device 800 may access a radio network based on a communication standard, such as WiFi, 2G or 3G, or their combination. In an example, the communication assembly 816 receives a broadcast signal or broadcast related information from an external broadcast management system via a broadcast channel. In an example, the communication assembly 816 further includes a near field communication (NFC) module to promote short-range communication. For instance, the NFC module may be implemented on the basis of a radio frequency identification (RFID) technology, an infrared data association (IrDA) technology, an ultra wide band (UWB) technology, a Bluetooth (BT) technology, etc.

In an example, the communication device 800 may be implemented by at least one of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic elements to execute the method above.

In an example, further provided is a non-transitory computer-readable storage medium including an instruction, for instance, a memory 804 including an instruction, and the instruction above may be executed by the processor 820 of the communication device 800 so as to implement the method above. For instance, the non-transitory computer-readable storage medium may be a read-only memory (ROM), a random access memory (RAM), a compact disc read-only memory (CD-ROM), a magnetic tape, a floppy disk, an optical data storage apparatus, etc.

Figure 9:
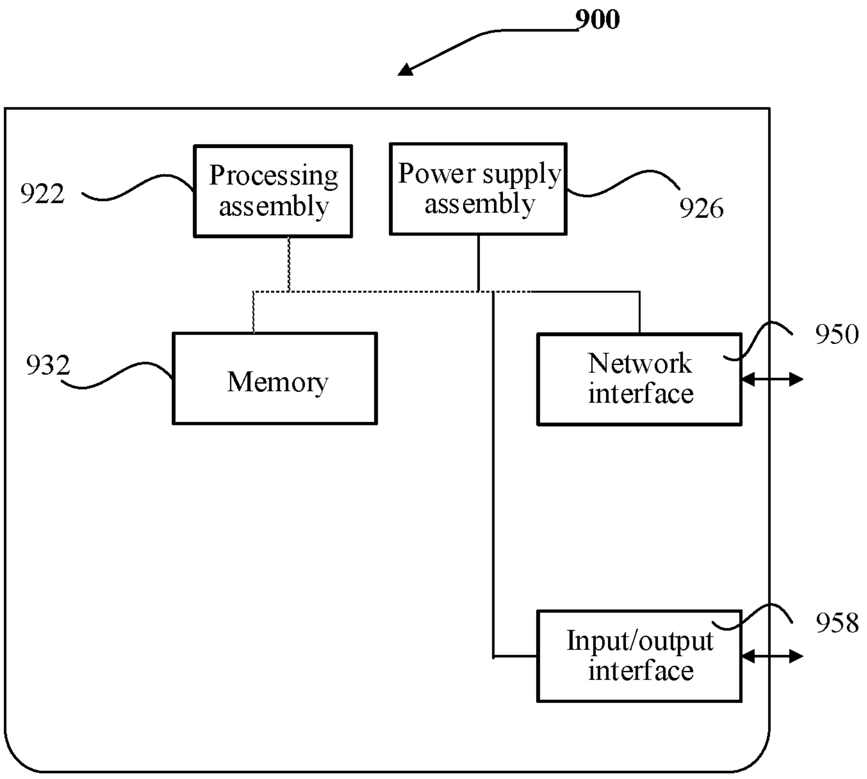
FIG. 9 is a second schematic structural diagram of a communication device according to an example.

As shown in FIG. 9, a structure of another communication device is shown according to an example of the disclosure. The communication device may be a base station involved in the example of the disclosure. For instance, the communication device 900 may be provided as a network device. With reference to FIG. 9, the communication device 900 includes a processing assembly 922 and further includes at least one processor, and a memory resource represented by a memory 932 for storing instructions, such as applications that may executed be by the processing assembly 922. The applications stored in the memory 932 may include one or more modules each corresponding to a set of instructions. In addition, the processing assembly 922 is configured to execute instructions to execute any method, applied to the communication device, of the foregoing methods.

The communication device 900 may further include a power supply assembly 926 configured to execute power management of the communication device 900, a wired or radio network interface 950 configured to network the communication device 900, and an input-output (I/O) interface 958. The communication device 900 may operate an operation system stored in the memory 932, such as Windows Server™, Mac OS X™, Unix™, Linux™ and FreeBSD™.

Those skilled in the art could easily conceive of other implementation solutions of the disclosure upon consideration of the description and implementation of the invention disclosed here. The disclosure is intended to cover any variation, use or adaptive change of the disclosure, which follows general principles of the disclosure and includes common general knowledge or conventional technical means in the technical field not disclosed in the disclosure. The description and the example are merely considered illustrative, and a true scope and spirit of the disclosure are indicated by the following claims.

It may be understood that the disclosure is not limited to precise structures described above and shown in the accompanying drawings, and various modifications and changes can be made without departing from the scope of the disclosure. The scope of the disclosure is merely limited by the appended claims.

According to a first aspect of examples of the disclosure, a method for controlling a timer is provided. The method is applied to a terminal and includes:

in response to determining that a timer of a first discontinuous reception (DRX) configuration among a plurality of DRX configurations in the terminal is to be started, determining an operation on the timer of the first DRX configuration according to a running state of a timer of a second DRX configuration among the plurality of DRX configurations.

In some examples, the determining an operation on the timer of the first DRX configuration according to a running state of a timer of a second DRX configuration among the plurality of DRX configurations includes:

in response to determining that the timer of the second DRX configuration is running, determining the operation on the timer of the first DRX configuration according to a running time range of the timer of the second DRX configuration; and or, in response to determining that the timer of the second DRX configuration among the plurality of DRX configurations is not running, starting the timer of the first DRX configuration according to the first DRX configuration.

In some examples, the determining the operation on the timer of the first DRX configuration according to a running time range of the timer of the second DRX configuration includes:

determining to restart the timer of the first DRX configuration according to the running time range of the timer of the second DRX configuration; and or, determining to continue running the timer of the second DRX configuration according to the running time range of the timer of the second DRX configuration.

In some examples, the determining to restart the timer of the first DRX configuration according to the running time range of the timer of the second DRX configuration includes:

determining to restart the timer of the first DRX configuration in response to determining that a timeout time point of the running timer of the second DRX configuration is earlier than a timeout time point of the first DRX configuration.

In some examples, the determining to continue running the timer of the second DRX configuration according to the running time range of the timer of the second DRX configuration includes:

in response to determining that a timeout time point of the running timer of the second DRX configuration is later than a timeout time point of the first DRX configuration, determining to continue running the timer of the second DRX configuration; and or, in response to determining that a timeout time point of the running timer of the second DRX configuration is equal to a timeout time point of the first DRX configuration, determining to continue running the timer of the second DRX configuration.

In some examples, the timer of the first DRX configuration and the timer of the second DRX configuration are the same type of timers.

In some examples, the plurality of DRX configurations are DRX configurations for a sidelink (SL).

According to a second aspect of the examples of the disclosure, an apparatus for controlling a timer is provided. The apparatus is applied to a terminal and includes:

a determination module configured to determine, in response to determining that a timer of a first DRX configuration among a plurality of DRX configurations in the terminal is to be started, an operation on the timer of the first DRX configuration according to a running state of a timer of a second DRX configuration among the plurality of DRX configurations.

In some examples, the determination module includes:

a first determination sub-module configured to determine, in response to determining that the timer of the second DRX configuration is running, the operation on the timer of the first DRX configuration according to a running time range of the timer of the second DRX configuration; and or, a first start sub-module configured to start, in response to determining that the timer of the second DRX configuration among the plurality of DRX configurations is not running, the timer of the first DRX configuration according to the first DRX configuration.

In some examples, the first determination sub-module includes:

a second determination sub-module configured to determine to restart the timer of the first DRX configuration according to the running time range of the timer of the second DRX configuration; and or, a third determination sub-module configured to determine to continue running the timer of the second DRX configuration according to the running time range of the timer of the second DRX configuration.

In some examples, the second determination sub-module includes:

a first restart sub-module configured to determine to restart the timer of the first DRX configuration in response to determining that a timeout time point of the running timer of the second DRX configuration is earlier than a timeout time point of the first DRX configuration.

In some examples, the third determination sub-module includes:

a first running sub-module configured to determine to continue running the timer of the second DRX configuration in response to determining that a timeout time point of the running timer of the second DRX configuration is later than a timeout time point of the first DRX configuration; and or, a second running sub-module configured to determine to continue running the timer of the second DRX configuration in response to determining that a timeout time point of the running timer of the second DRX configuration is equal to a timeout time point of the first DRX configuration.

In some examples, the timer of the first DRX configuration and the timer of the second DRX configuration are the same type of timers.

In some examples, the plurality of DRX configurations are DRX configurations for an SL.

According to a third aspect of the examples of the disclosure, a communication device is provided. The communication device at least includes a processor and a memory for storing an executable instruction that may run on the processor, where the executable instruction executes steps in any of the above method for controlling a timer when the processor is configured to run the executable instruction.

According to a fourth aspect of the examples of the disclosure, a non-transitory computer-readable storage medium is provided, and stores a computer-executable instruction, where the computer-executable instruction implements steps in any of the above method for controlling a timer when executed by a processor.

What is claimed is:

1. A method for controlling a timer, performed by a terminal, and comprising:

determining that a timer of a first discontinuous reception (DRX) configuration among a plurality of DRX configurations in the terminal is to be started; and determining an operation on the timer of the first DRX configuration according to a running state of a timer of a second DRX configuration among the plurality of DRX configurations, wherein the plurality of DRX configurations are DRX configurations for a sidelink (SL);

wherein determining the operation on the timer of the first DRX configuration according to the running state of the timer of the second DRX configuration among the plurality of DRX configurations comprises:

determining that the timer of the second DRX configuration among the plurality of DRX configurations is not running; and starting the timer of the first DRX configuration according to the first DRX configuration;

wherein determining the operation on the timer of the first DRX configuration according to the running state of the timer of the second DRX configuration among the plurality of DRX configurations comprises:

determining that the timer of the second DRX configuration is running; and determining the operation on the timer of the first DRX configuration according to a running time range of the timer of the second DRX configuration; and wherein determining the operation on the timer of the first DRX configuration according to the running time range of the timer of the second DRX configuration comprises: determining to start the timer of the first DRX configuration according to the running time range of the timer of the second DRX configuration; wherein determining to start the timer of the first DRX configuration according to the running time range of the timer of the second DRX configuration comprises: determining that a timeout time point of the running timer of the second DRX configuration is earlier than a timeout time point of the first DRX configuration; and determining to restart the timer of the first DRX configuration;

or wherein determining the operation on the timer of the first DRX configuration according to the running time range of the timer of the second DRX configuration comprises: determining to continue running the timer of the second DRX configuration according to the running time range of the timer of the second DRX configuration; wherein determining to continue running the timer of the second DRX configuration according to the running time range of the timer of the second DRX configuration comprises: determining that the timeout time point of the running timer of the second DRX configuration is equal to the timeout time point of the first DRX configuration; and determining to continue running the timer of the second DRX configuration.

2. The method according to claim 1, wherein determining to continue running the timer of the second DRX configuration according to the running time range of the timer of the second DRX configuration comprises:

determining that the timeout time point of the running timer of the second DRX configuration is later than the timeout time point of the first DRX configuration; and determining to continue running the timer of the second DRX configuration.

3. The method according to claim 1, wherein the timer of the first DRX configuration and the timer of the second DRX configuration are the same type of timers.

4. A communication device, comprising a processor and a memory for storing an executable instruction that can run on the processor, wherein the processor is configured to:

determine that a timer of a first discontinuous reception (DRX) configuration among a plurality of DRX configurations in a terminal is to be started; and determine an operation on the timer of the first DRX configuration according to a running state of a timer of a second DRX configuration among the plurality of DRX configurations, wherein the plurality of DRX configurations are DRX configurations for a sidelink (SL);

wherein the processor is further configured to:

determine that the timer of the second DRX configuration among the plurality of DRX configurations is not running; and start the timer of the first DRX configuration according to the first DRX configuration;

wherein the processor is further configured to:

determine that the timer of the second DRX configuration is running; and determine the operation on the timer of the first DRX configuration according to a running time range of the timer of the second DRX configuration; and wherein the processor is further configured to: determine to start the timer of the first DRX configuration according to the running time range of the timer of the second DRX configuration; wherein the processor is further configured to: determine that a timeout time point of the running timer of the second DRX configuration is earlier than a timeout time point of the first DRX configuration; and determine to restart the timer of the first DRX configuration;

or wherein the processor is further configured to: determine to continue running the timer of the second DRX configuration according to the running time range of the timer of the second DRX configuration; wherein the processor is further configured to: determine that the timeout time point of the running timer of the second DRX configuration is equal to the timeout time point of the first DRX configuration; and determine to continue running the timer of the second DRX configuration.

5. The communication device according to claim 4, wherein the processor is further configured to:

determine that the timeout time point of the running timer of the second DRX configuration is later than the timeout time point of the first DRX configuration; and determine to continue running the timer of the second DRX configuration.

6. The communication device according to claim 4, wherein the timer of the first DRX configuration and the timer of the second DRX configuration are the same type of timers.

7. A non-transitory computer-readable storage medium, storing a computer-executable instruction, wherein the computer-executable instruction when executed by a processor, causes the processor to:

determine that a timer of a first discontinuous reception (DRX) configuration among a plurality of DRX configurations in the terminal is to be started; and determine an operation on the timer of the first DRX configuration according to a running state of a timer of a second DRX configuration among the plurality of DRX configurations, wherein the plurality of DRX configurations are DRX configurations for a sidelink (SL);

wherein the computer-executable instruction when executed by a processor, further causes the processor to:

determine that the timer of the second DRX configuration among the plurality of DRX configurations is not running; and start the timer of the first DRX configuration according to the first DRX configuration;

wherein the computer-executable instruction when executed by a processor, further causes the processor to:

determine that the timer of the second DRX configuration is running; and determine the operation on the timer of the first DRX configuration according to a running time range of the timer of the second DRX configuration; and wherein the computer-executable instruction when executed by a processor, further causes the processor to: determine to start the timer of the first DRX configuration according to the running time range of the timer of the second DRX configuration; wherein the computer-executable instruction when executed by a processor, further causes the processor to: determine that a timeout time point of the running timer of the second DRX configuration is earlier than a timeout time point of the first DRX configuration; and determine to restart the timer of the first DRX configuration; or wherein the computer-executable instruction when executed by a processor, further causes the processor to: determine to continue running the timer of the second DRX configuration according to the running time range of the timer of the second DRX configuration; wherein the computer-executable instruction when executed by a processor, further causes the processor to: determine that the timeout time point of the running timer of the second DRX configuration is equal to the timeout time point of the first DRX configuration; and determine to continue running the timer of the second DRX configuration.

* * * * *